(12) United States Patent
Haserodt et al.

(10) Patent No.: US 10,051,067 B2
(45) Date of Patent: Aug. 14, 2018

(54) ABSTRACT ACTIVITY COUNTER

(71) Applicant: Avaya Inc., Santa Clara, CA (US)

(72) Inventors: Kurt H. Haserodt, Westminster, CO (US); William T. Walker, Evergreen, CO (US)

(73) Assignee: Avaya Inc., Santa Clara ( * ) Notice: Subject to any disclaimer, the term of this patent is extended or adjusted under 35 U.S.C. 154(b) by 334 days.

(21) Appl. No.: 14/504,057

(22) Filed: Oct. 1, 2014

(65) Prior Publication Data

US 2016/0099850 A1   Apr. 7, 2016

(51) Int. Cl.
*G06F 15/173* (2006.01)
*H04L 29/08* (2006.01)
*H04L 12/26* (2006.01)

(52) U.S. Cl.
CPC .............. *H04L 67/22* (2013.01); *H04L 43/04* (2013.01); *H04L 67/02* (2013.01); *H04L 67/14* (2013.01)

(58) Field of Classification Search
CPC ............. H04L 12/2602; H04L 12/2642; H04L 12/2692; H04L 12/2818; H04L 29/06; H04L 29/08099; H04L 41/5003; H04L 41/5096; H04L 43/04; H04L 43/08; H04L 67/02; H04L 67/025; H04L 67/22; G06F 11/30; G06F 11/34; G06F 9/542; G06F 2201/86
USPC .......................................................... 709/224
See application file for complete search history.

(56) References Cited

U.S. PATENT DOCUMENTS

| | | | | |
|---|---|---|---|---|
| 6,789,046 | B1 * | 9/2004 | Murstein ............. | G06F 11/3476 702/182 |
| 7,962,616 | B2 * | 6/2011 | Kupferman ......... | G06F 11/3495 709/224 |
| 9,483,387 | B1 * | 11/2016 | Allocca ............... | G06F 11/3688 |
| 2007/0083647 | A1 * | 4/2007 | Frost ................... | G06F 11/3419 709/224 |
| 2007/0094379 | A1 * | 4/2007 | Stecher ................ | G06F 9/5083 709/224 |
| 2008/0320123 | A1 * | 12/2008 | Houlihan ............. | G06F 9/4856 709/224 |

(Continued)

OTHER PUBLICATIONS

Kim, Jong Yul, and Henning Schulzrinne. "SipCloud: Dynamically scalable SIP proxies in the cloud." Proceedings of the 5th International Conference on Principles, Systems and Applications of IP Telecommunications. ACM, 2011.*

*Primary Examiner* — Peling Shaw
(74) *Attorney, Agent, or Firm* — Sheridan Ross P.C.

(57) ABSTRACT

In order to provide a more realistic system activity score, an activity monitor gathers activity scores from a plurality of processes on one or more communication systems. An activity score defines an activity level of a particular process. For example, how many cache hits per second are occurring in a communication system or how may a HTTP sessions a web server is handling per second. Because the activity scores are gathered from individual processes within the communication system(s), a more realistic understanding of the overall activity of the communication system(s) can be determined. The gathered activity scores are summed to produce a system activity score. The system activity score is then sent to a user. The user can then utilize the system activity score to better manage the communication system(s).

20 Claims, 5 Drawing Sheets

(56) References Cited

U.S. PATENT DOCUMENTS

| | | | | |
|---|---|---|---|---|
| 2009/0070784 A1* | 3/2009 | Schmidt | G06F 11/3495 719/318 |
| 2009/0144420 A1* | 6/2009 | Attanasio | H04L 41/046 709/224 |
| 2011/0208911 A1* | 8/2011 | Taguchi | G06F 1/3221 711/114 |
| 2013/0030868 A1* | 1/2013 | Lyon | G06Q 30/0236 705/7.33 |
| 2013/0297802 A1* | 11/2013 | Laribi | H04L 47/80 709/226 |
| 2014/0258546 A1* | 9/2014 | Janssens | G06F 9/5088 709/226 |
| 2014/0280892 A1* | 9/2014 | Reynolds | H04L 43/028 709/224 |
| 2015/0046212 A1* | 2/2015 | Mos | G06Q 10/0633 705/7.27 |
| 2015/0095892 A1* | 4/2015 | Baggott | G06F 11/3612 717/127 |
| 2015/0326535 A1* | 11/2015 | Rao | H04L 41/5054 726/15 |
| 2016/0080446 A1* | 3/2016 | Karthikeyan | H04L 65/4076 709/219 |
| 2016/0087861 A1* | 3/2016 | Kuan | H04L 43/065 709/224 |

* cited by examiner

US 10,051,067 B2

ABSTRACT ACTIVITY COUNTER

TECHNICAL FIELD

The systems and methods disclosed herein relate to communication systems and in particular to monitoring the activity of communication systems.

BACKGROUND

When a communication system is deployed within an enterprise, the communication system will eventually have to be taken off-line. For example a communication system may need to be taken off-line for hardware failures, hardware upgrades, software upgrades, maintenance, and/or the like. Depending on when the communication system is taken off-line, various problems can arise. For instance, if a communication system is taken off-line during heavy usage, the service disruption may be unacceptable.

To deal with this problem, some communication systems provide the ability for an administrator to view a system activity score. The activity score is based on a single type of activity, such as a count of the number of currently supported calls. The problem with using a single activity score for the communication system is that this may not accurately reflect the overall activity of the communication system; this can be due to the communication system running other processes not related to the single type of activity. This can result in a communication system being taken off-line at a time when the system is heavily loaded resulting in an unwanted disruption of services.

SUMMARY

Systems and methods are provided to solve these and other problems and disadvantages of the prior art. In order to provide a more realistic system activity score, an activity monitor gathers activity scores from a plurality of processes on one or more communication systems. An activity score defines an activity level of a particular process. For example, how many cache hits per second are occurring in a communication system or how may a HTTP sessions a web server is handling per second. Because the activity scores are gathered from individual processes within the communication system(s), a more realistic understanding of the overall activity of the communication system(s) can be determined. The gathered activity scores are summed to produce a system activity score. The system activity score is then sent to an administrative user. The administrative user can then utilize the system activity score to better manage the communication system(s).

DETAILED DESCRIPTION

Figure 1:
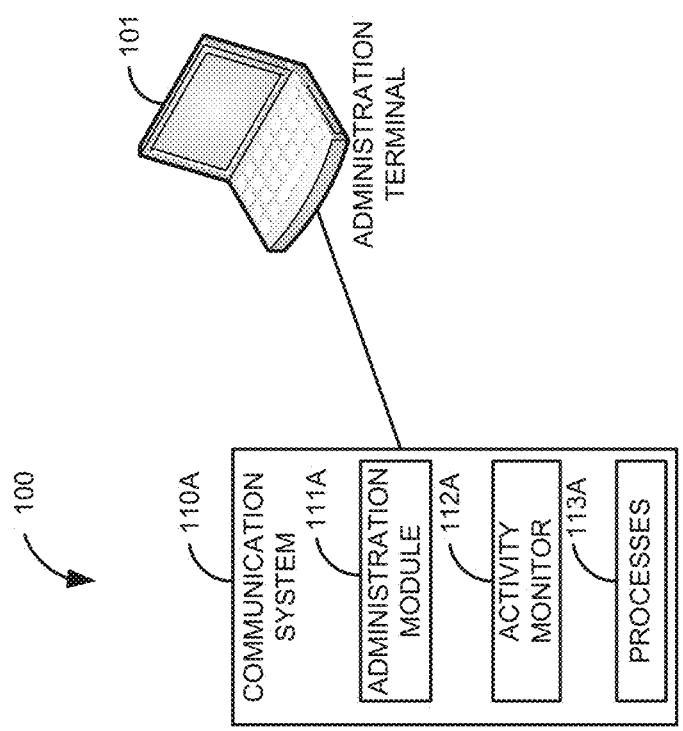
FIG. 1 is a block diagram of a first illustrative system for monitoring an activity level of a communication system.

FIG. 1 is a block diagram of a first illustrative system 100 for monitoring an activity level of a communication system 110A. The first illustrative system 100 comprises the communication system 110A and an administration terminal 101.

The communication system 110A can be any type of communication system 110 for managing communication sessions, such as a central office switch, a Private Branch Exchange (PBX), a router, a hub, an Instant Messaging (IM) server, an email server, a text messaging server, a video switch, a session boarder controller, a Session Initiation Protocol (SIP) proxy server, a combination of these, a collection of these, and the like. The communication system 110A can support a variety of protocols, such as SIP, H.323, video protocols, email protocols, IM protocols, text messaging protocols, voice protocols, Internet Protocol (IP), and/or the like.

The communication system 110A further comprises an administration module 111A, an activity monitor 112A, and processes 113A. The administration module 111A can be or may include any hardware/software that allows an administrator to access information in the communication system 110A, such as a web server, administration software, and/or the like. The administration module 111A is shown in the communication system 110A. However, in some embodiments, the administration module 111A may be distributed between the communication system 110A and the administration terminal 101 or wholly on the administration terminal 101.

The activity monitor 112A can be or may include any hardware/software that can gather information from multiple processes 113A. The activity monitor 112A can gather information from a variety of sources, such as processes 113A within the communication system 110A, processes 113 within other communication systems 110, or processes 113 within other devices (e.g., from a network analyzer).

The processes 113A can be any process 113 that can be monitored individually. For example, the process may be an individual application or thread.

The administration terminal 101 can be or may include be any device that can communicate with the communication system 110A, such as a Personal Computer (PC), a telephone, a video endpoint, a cellular telephone, a Personal Digital Assistant (PDA), a tablet device, a notebook device, and the like. While FIG. 1 only shows a single administration terminal 101 connected directly to the communication system 110A, multiple administration terminals 101 may be connected to the communication system 110A. In addition, the administration terminal 101 may be connected via a network.

The activity monitor 112A gathers activity scores for processes 113A in the communication system 110A. An activity scores indicates a level of activity of an individual process 113A. The activity scores are typically associated with a process 113A within the communication system 110A. However, in some embodiments, the activity scores may be associated with one or more processes 113A that are external to the communication system 110A, such as based on network congestion, packet retransmissions, a number of available fallback servers, input from an external network analyzer, a combination of these, and the like. The activity scores can be based on a variety of functions associated with the processes 113A, such as, a number of current voice or video calls, a number of current Hyper Text Transfer Protocol (HTTP) sessions, a number of sent email messages over a time period, a number of received email messages over a time period, a number of current Instant Messaging (IM) sessions, a number of processed packets, a number of packet retransmissions, a network congestion value, memory usage in the communication system 110A, a number of disk access requests (e.g., disk accesses for each disk in the communication system 110A), a number of fall-back servers that are available, a number of cache hits and/or misses (can be for one or more caches in the communication system 110A), a number of logged on users, a total number of Back-to-Back User Agents (B2BUA) loaded (e.g., SIP B2BUAs), a average number of B2BUAs used per communication session, a number of conference calls that include three or more users, a number of virtual machines, a number of active virtual machines, a number of threads, input from a network analyzer external to the communications system, input from a network analyzer, and/or the like.

The activity scores of the processes 113A can be calculated in various ways depending on the type of activity score. In some embodiments, an activity score of a process 113A can be a normalized activity percentage of a full capacity of the process 113A. For example, an email application that supports 6000 emails in a queue would show an activity score of 50% when there are 3000 emails in the email queue.

In another embodiment, the activity score can be based on a threshold. For example, if disk accesses reach a certain threshold (e.g., 90%) the activity score may indicate a full normalized value (e.g. 100 on a scale of 1 to 100). Another example is where the threshold is based on a specific number fallback servers being available. If there is only a single fallback server (i.e., the communication system 110A) available, the normalized value can be set to 100. Alternatively, if there are two or more fallback servers available, the normalized value can be set to zero (0).

In other embodiments, the activity score of a process 113A can be based on a logarithmic algorithm where the activity score for the process 113A increases exponentially based on multiple thresholds.

After gathering the activity scores for the processes 113A, the activity monitor 112A sums the activity scores for the processes 113A into a system activity score. The summation of the activity scores for the processes 113A can be accomplished in a variety of ways. For example, each activity score for each process 113A can be normalized to a scale (e.g., 1 to 100) before being summed. The activity scores for each of each individual process 113A can then be averaged to create the system activity score.

In some embodiments, an individual activity score for a specific process 113 may be given a higher weight than a different process 113. For example, an activity score for a number of disk accesses may be given twice the weight versus a number of B2BUAs that are loaded to produce the system activity score.

In other embodiments, an activity score for a specific process 113 may override another activity score when the activity score for the specific process 113 reaches a defined threshold. For example, an activity score of a number of packet retransmissions may override an activity score for a number of processed packets when the number of packet retransmissions reaches 30 retransmissions per second.

In other embodiments, the activity score for a specific process 113A may override all the activity scores for other processes 113 when the activity score for the specific process 113 reaches a defined threshold. For example, if there no fallback servers available (i.e., the fallback server has failed or is offline), the activity score for the fallback server can override the activity scores for all other processes 113.

Once the activity score has been generated by the activity monitor 112A, the system activity score is sent to a user (e.g., an administrator) by the administration module 111A. For instance, the administration module 111A can include a web server that presents the system activity score to the user via a browser in the administration terminal 101. The user can then use the system activity score to determine the busyness of the communication system 110A. For example, an administrator can employ the system activity score to determine whether to shutdown the communication system 110A for a software upgrade. If the system activity score is too high, the administrator may delay the software upgrade until a time when the system activity score is at an acceptable value.

Figure 2:
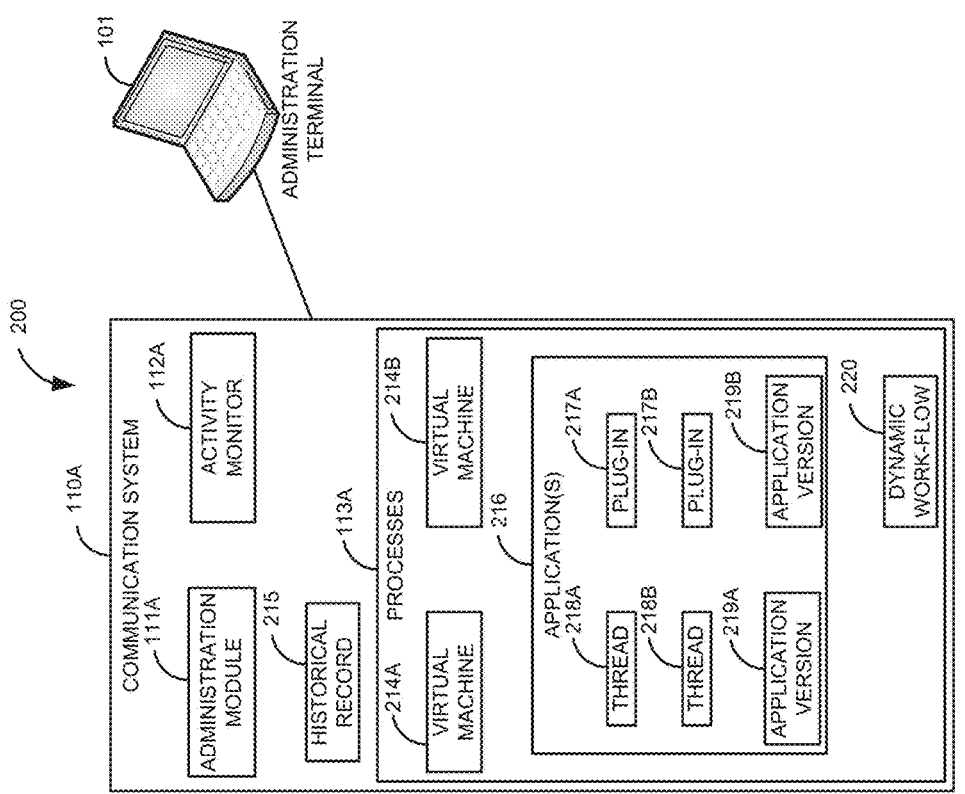
FIG. 2 is a block diagram of a second illustrative system for monitoring an activity level of a communication system.

FIG. 2 is a block diagram of a second illustrative system 200 for monitoring an activity level of a communication system 110A. The second illustrative system 200 comprises the communication system 110A and the administration terminal 101.

In this embodiment, the communication system 110A comprises the administration module 111A, the activity monitor 112A, the processes 113A and a historical record 215. The historical record 215 is an historical record of activity scores that have been accumulated over time for the communication system 110A. The historical record 215 may include activity scores for one or more processes 113A. The historical record 215 may also include a historical record of system activity scores.

The processes 113A, in this embodiment, comprise virtual machines 214A and 214B, an application(s) 216, and a dynamic work-flow 220. The virtual machines 214A and 214B may be virtual machines 214 running on one or more microprocessors. For example, the virtual machines 214A and 214B may be running on the same processor or on separate processors. Although FIG. 2 only shows two virtual machines 214A and 214B, any number of virtual machines 214, including only a single virtual machine 214, may be running on the communication system 110A.

The application(s) 216 can be any type of application that runs on the communication system 110A, such as a telecommunication application, a video application, an email application, an Instant Messaging (IM) application, a text application, a computational process, an operating system, a web server, a networking application, a social network application, a combination of these, and the like.

The application(s) 216 further comprises plug-ins 217A and 217B, threads 218A and 218B, and application versions 219A and 219B. The plug-ins 217A and 217B can be any software/hardware plug-in 217 that can be dynamically added to the application(s) 216. For example, the plug-ins 217A and/or 217B can be a Session Initiation Protocol (SIP) Back-to-Back User Agent (B2BUA). The plug-in 217A may be a SIP B2BUA that notifies the activity monitor 112A when the B2BUA is loaded (e.g., when a communication session is established). Alternatively, the plug-in 217 can be a software plug-in 217 that provides new services via an Application Programming Interface (API) for the application 216. For example, the plug-in 217B can be an email plug-in that dynamically provides email services for a video conferencing communication system 110A. The plug-ins 217A and 217B may be external to the application 216.

A thread 218 can be a process 113 that is started within the application 216. Alternatively, the thread 218 can be a process 113 that launches the application 216. In one embodiment, the thread 218A is a thread 218 that launches the application 216 and the thread 218B is a thread 218 that is started from within the application 216 (i.e., a daemon). The threads 218A and 218B can be multiple threads 218 that are started within the application 216. In another embodiment, the threads 218A and 218B may be in separate applications 216. Although only two threads 218A and 218B are shown in FIG. 2, the application(s) 216 may comprise one or more threads 218. Alternatively, the threads 218A and 218B may be separate from the application 216.

The application versions 219A and 219B are two different software versions of the application 216. The application version 219A may be a first release of software for the application 216 and the application version 219B may be a second version (or patch) of the application 216. For example, the communication system 110A may be a Private Branch Exchange (PBX) that is running two versions of software 219A and 219B on two different virtual machines 214A and 214B. This may because a customer has only upgraded part of the communication system 110A. Although only a two application versions 219A and 219B are shown in FIG. 2, the application 216 may include one or more application versions 219. The software versions 219A and 219B may be running on separate communications systems 110 (e.g., communication systems 110A-110C as shown in FIG. 3).

The dynamic work-flow 220 is a process 113 that can be created dynamically by a user. For example, the dynamic work-flow 220 can be a dynamically created work-flow created by an administrator of the communication system 110A using a software development tool. The dynamically created work-flow may be an application 216 that provides new features to an existing communication session, such as a voice call monitoring application that notifies a specific user based on a work spoken in the voice call.

Two or more of the processes 113 (the virtual machines 214A and 214B, the application(s) 216, the plug-ins 217A and 217B, the threads 218A and 218B, the application versions 219A and 219B, and/or the dynamic work-flow 220) can generate activity scores that are gathered by the activity monitor 112A. The activity monitor 112A can then sum the activity scores from the processes 113A into a system activity score for the communication system 110A. The system activity is then sent to a user.

Figure 3:
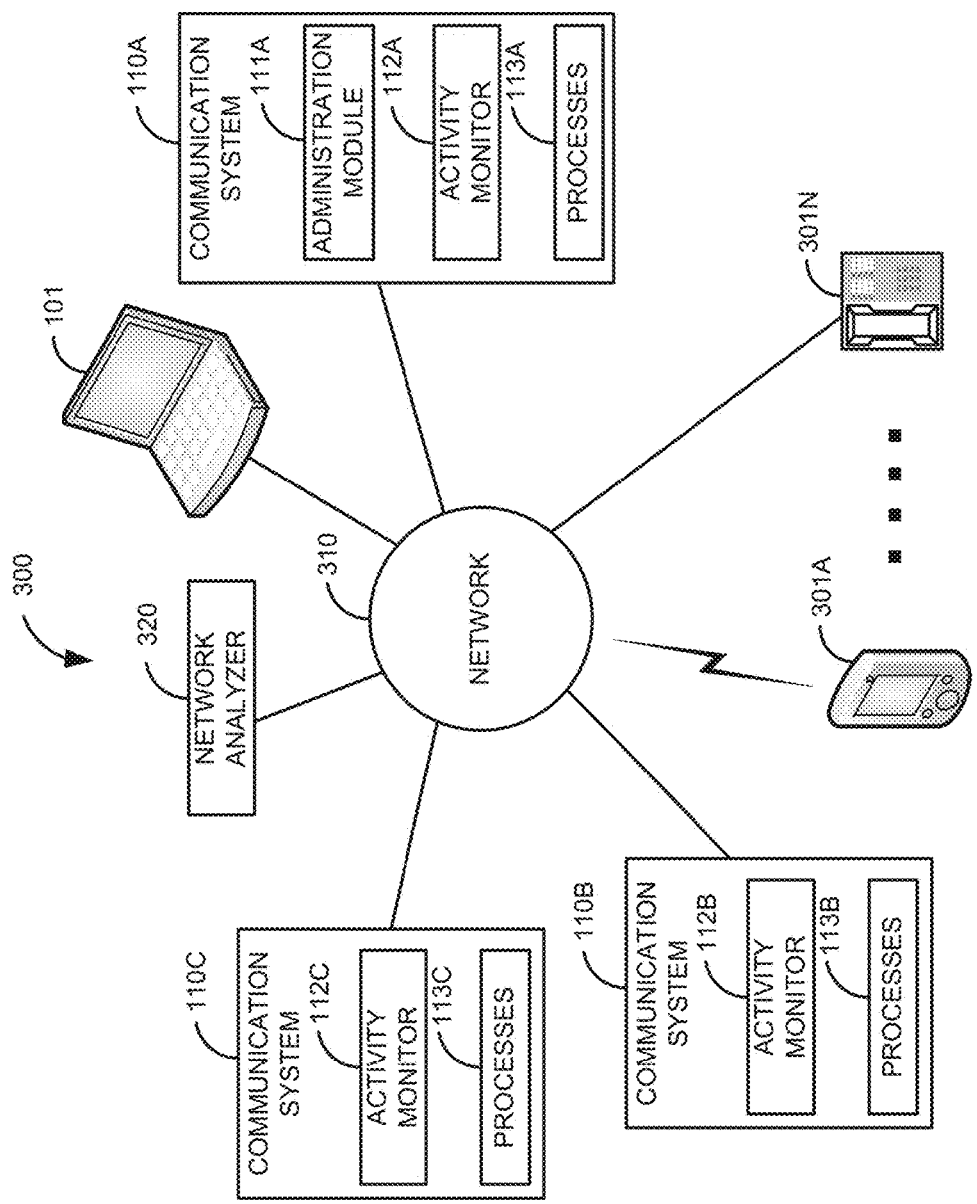
FIG. 3 is a block diagram of a third illustrative system for monitoring an activity level of a plurality of communication systems.

FIG. 3 is a block diagram of a third illustrative system 300 for monitoring an activity level of a plurality of communication systems 110A-110C. The third illustrative system 300 comprises communication devices 301A-301N, communication systems 110A-110C, a network 310, a network analyzer 320, and the administration terminal 101.

In this embodiment, the administration terminal 101 is shown as being connected to the network 310. The user can employ the administration terminal 101 to receive the system activity score from the communication system 110A via the network 310.

The communication devices 301A-301N can be or may include be any device that can communicate on the network 310, such as a Personal Computer (PC), a telephone, a video system, a cellular telephone, a Personal Digital Assistant (PDA), a tablet device, a notebook device, a server, and the like. As shown in FIG. 1, any number of communication devices 301A-301N may be connected to network 310, including only a single communication device 301. In addition, the communication device 301 may be directly connected to the communication system 110.

The network 310 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 310 can use a variety of protocols, such as Ethernet, Internet Protocol (IP), Session Initiation Protocol (SIP), Integrated Services Digital Network (ISDN), video protocols, email protocols, text protocols, and/or the like.

The communication systems 110A-110C are shown as being similar to the communication system 110A in FIG. 1. However, the communication systems 110A-110C of FIG. 3 can be similar to the communication system 110A as described in FIG. 1 and/or FIG. 2. Although there are only three communication systems 110A-110C shown in FIG. 3, any number of communication systems 110 may be connected to the network 310.

The network analyzer 320 can be or may include any device that can monitor or sniff packets on the network 310. In some embodiments, the network analyzer 320 may be included in the communication systems 110A-110C. In this example, the network analyzer 320 can monitor packets sent/received to and from the communication system 110. In some embodiments, the network analyzer 320 can be included in one or more of the communication devices 301A-301N. In this embodiment, the network analyzer 320 can monitor packets sent/received to and from the communication devices 301A-301N.

In FIG. 3, only the communication system 110A includes the administration module 111A. However, in other embodiments, the communication systems 110B-110C may also include the administration module 111A. FIG. 3 illustrates a hierarchical communication system 110 of where the communication system 110A is at the top of the hierarchy and the communication systems 110B-110C are at the bottom of the hierarchy. In this embodiment, the activity monitor 112A, in addition to gathering the activity scores form the processes 113A, gathers the activity scores from the activity monitors 112B-112C for the processes 113B and 113C via the network 310. The activity monitor 112A sums the activity scores from the processes 113A-113C to product the system activity score. The administration module 111A sends the system activity score to the user of the communication system 110A.

To illustrate, consider the following example. Assume that the process 113A is a first dynamically loadable plug-in 217, the process 113B is a second dynamically loadable plug-in 217, and the process 113C is a thread 218 in an application 216. The activity monitor 112A gathers the activity scores for the processes 113B-113C via the activity monitors 112B-112C. The activity monitor 112A gets the activity score for the process 113A. The activity monitor 112 uses the activity scores from the processes 113A-113C to generate the system activity score.

In one embodiment, the processes 113A and 113B are dynamically loadable plug-ins 217A and 217B are loaded based on the initiation of a communication session (e.g., SIP B2BUAs that are loaded when a voice communication session is initiated). The dynamically loaded plug-ins 217 may be processes 113 on the same or different communication systems 110.

In one embodiment, an activity score can be based on a communication device 301A-301N (e.g., a communication endpoint) as well as a process 113 in the communication system 110. This allows further flexibility in monitoring the status of the system 300 as a whole.

In another embodiment, an activity score can be generated by the network analyzer 320. The network analyzer 320 can send the activity score to the activity monitor 112A. For example, the activity score can be for a number of packets, packet retransmissions, packet congestion, and/or the like.

In other embodiments, in addition to the system activity score being sent to the user, the individual activity scores of each process 113 and/or system activity score for an individual communication system 110A-110C can be sent to the user. This allows the user to see which individual processes 113/individual communication systems 110 may be more heavily loaded than other processes 113/individual communication systems 110. This way the user may decide to only take down a particular process 113, group of processes 113, and/or individual communication system 110 that is lightly loaded.

Figure 4:
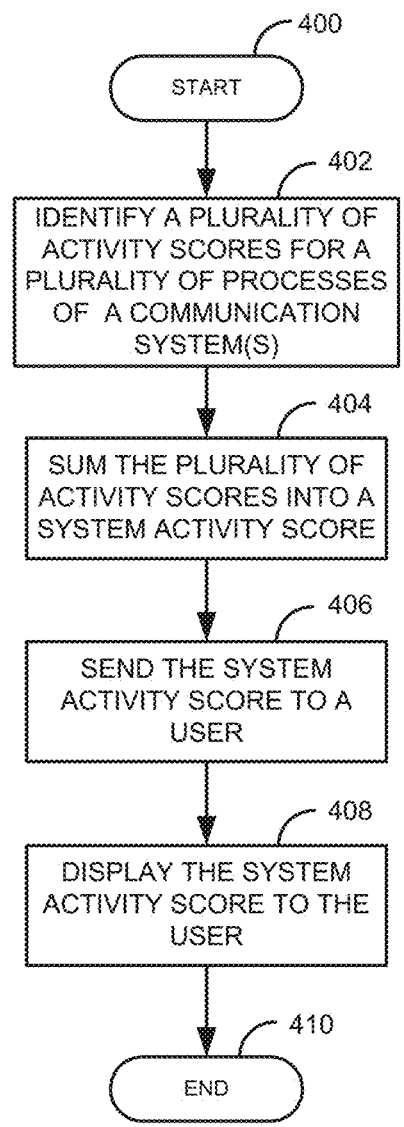
FIG. 4 is a flow diagram of a procedure for monitoring an activity level of a communication system.
Figure 5:
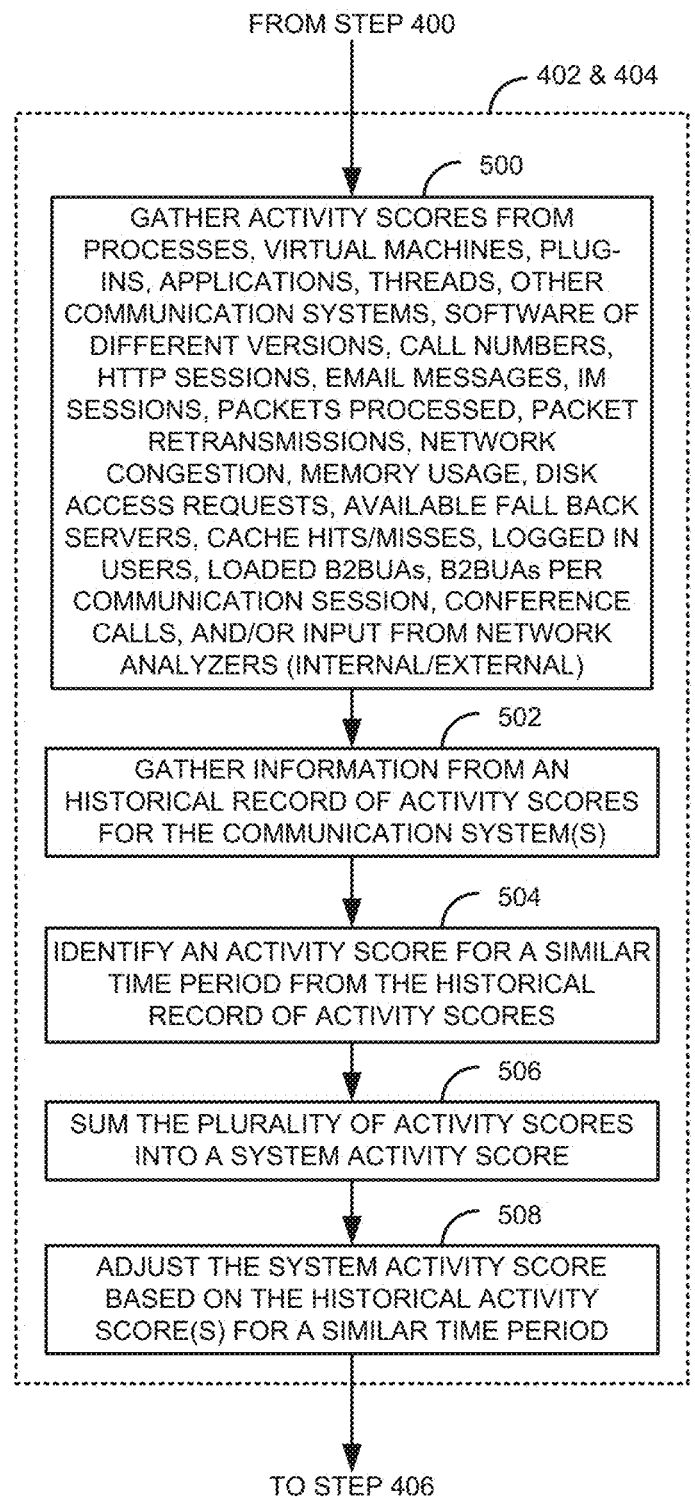
FIG. 5 is a flow diagram of a procedure for gathering activity scores from different processes.

FIG. 4 is a flow diagram of a procedure for monitoring an activity level of a communication system 110. Illustratively, the communication system 110, the administration module 111, the activity monitor 112, the processes 113, the virtual machines 214, the applications 216, the threads 218, the plug-ins 217, the application versions 129, and the dynamic work-flow 220 are stored-program-controlled entities, such as a computer or processor, which performs the method of FIGS. 4-5 and the processes described herein by executing program instructions stored in a tangible computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The procedure starts in step 400. The procedure identifies a plurality of activity scores for a plurality of processes 113 from one or more communication systems 110 in step 402. The procedure sums the plurality of activity scores into a system activity score in step 404. The procedure sends the system activity score to a user in step 406. The activity score is displayed to the user in step 408. The procedure ends in step 410.

FIG. 5 is a flow diagram of a procedure for gathering activity scores from different processes 113. FIG. 5 is an illustrative example of steps 402 and 404 of FIG. 4. After the procedure starts in step 400, the procedure gathers activity scores from various processes 113 in step 500. For example, the procedure can gather activity scores from different virtual machines 214, different plug-ins 217, different applications 216, different threads 218, other communication systems 110, software of different versions 219, a number of calls, a number of HTTP sessions, a number of email messages, a number of Instant Messaging (IM) sessions, a number of packets processed, a number of packet retransmissions, network congestion, memory usage, a number of disk access requests, a number of available fall back servers, a number of cache hits/misses, a number of logged in users, a number of loaded B2BUAs, a number of B2BUAs loaded per communication session, a number of conference calls (three or more participants), input from a network analyzer 320 (internal or external), and/or the like.

The procedure gathers information from an historical record 215 of activity scores for the communication system(s) 110 in step 502. The historical record 215 may comprise one or more system activity scores that are captured over time. For example, the historical record 215 may comprise individual system activity scores from a plurality of communication systems 110 (i.e., one system activity score from each of the communication systems 110A-110C) or an overall system activity score for the plurality of communication systems 110A-110C. The historical record 215 may comprise one or more specific activity scores (i.e., the activity scores that are used to create the system activity score) that are captured over time. The activity scores may be captured based on a defined time period. In some embodiments, the defined period of an activity score may be different based on the particular type of activity score. For example, the activity score for the number of B2BUAs loaded per communication session may have a time period of one day and the activity score for the number of conference calls may have a time period of 10 minutes. The activity scores may be based on a rolling system of where older activity scores are overwritten by newer activity scores. Which activity scores are used in step 502 can be administered.

The procedure identifies one or more activity scores for a similar time period from the historical record 215 of activity scores in step 504. For example, the procedure can identify a system activity score for the same period during the previous week. In another embodiment, the procedure can identify a plurality of system activity scores during the same timer period for each week over the last year. In other embodiments, the procedure can identify individual activity scores for a particular process 113 at a similar time period.

The procedure sums the plurality of activity scores gathered in step 500 into a system activity score in step 506. The procedure adjusts the system activity score based on the historical activity score from the historical record 215 for the similar time period in step 508. For example, the system activity score in step 506 may be adjusted by averaging the system activity score from step 506 with the system activity score from the historical record 215 at similar time period one month ago. In another embodiment, the procedure adjusts the system activity score (from step 506) based on a historical activity score of an individual process 113 based on a similar time period. In one embodiment, the historical system activity score may be given a different weight versus the current system activity score.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system for determining activity of a communication system comprising:
   a microprocessor; and
   a computer readable medium, coupled with the microprocessor and comprising microprocessor readable and executable instructions that program the microprocessor to execute:
   an activity monitor that detects a plurality of computer processes that are active on one more devices in the communication system, gathers a plurality of activity scores for the communication system, wherein the plurality of activity scores indicate an activity value for the plurality of computer processes associated with the communication system, and sums the plurality activity scores into a system activity score, wherein the plurality of computer processes track at least an average number of Back-to-Back User Agents (B2BUAs) used per communication session; and an administration module that sends the system activity score to a user of the communication system.

2. The system of claim 1, wherein the activity monitor gathers the plurality of activity scores from separate computer processes on two or more virtual machines.

3. The system of claim 1, wherein a first one of the plurality of computer processes is on a first thread and wherein a second one of the plurality of computer processes is on a second thread.

4. The system of claim 1, wherein the activity monitor gathers the plurality of activity scores from a plurality of communication systems, wherein the system activity score is for the plurality of communication systems.

5. The system of claim 4, wherein a first computer process of the plurality computer processes is detected on a first communication system of the plurality of communication systems and wherein a second computer process of the plurality of computer processes is detected on a second communication system of the plurality of communication systems.

6. The system of claim 1, wherein the activity monitor gathers a historical record of activity scores for the communication system, gathers an activity score for a similar time period during a week from the historical record of activity scores for the communication system, and adjusts the system activity score based on the activity score for the similar time period during a week.

7. The system of claim 1, wherein the plurality of computer processes associated with the communication system include two or more of the following computer processes that track:
   a number of current Hyper Text Transfer Protocol (HTTP) sessions;
   a number of sent email messages over a time period;
   a number of received email messages over a time period;
   a number of current Instant Messaging (IM) sessions;
   a number of packet retransmissions;
   a number of disk access requests;
   a number of cache hits and/or misses;
   a total number of Back-to-Back User Agents (B2BUA) loaded;
   an average number of B2BUAs used per communication session;
   a number of conference calls that include three or more users;
   an input from a network analyzer external to the communications system; and
   an input from a network analyzer.

8. The system of claim 1, wherein a first one of the plurality of computer processes is a dynamically created work-flow and a second one of the plurality of computer processes is a static computer process.

9. The system of claim 1, wherein one of the plurality of activity scores for the communication system overrides all other activity scores for the communication system when the one of the plurality of activity scores reaches a threshold.

10. The system of claim 1, wherein the plurality of computer processes associated with the communication system track at least
   a number of conference calls that include three or more users.

11. The system of claim 1, wherein the plurality of computer processes associated with the communication system track at least
   a number of current Instant Messaging (IM) sessions.

12. The system of claim 1, wherein the plurality of computer processes associated with the communication system track at least a number of cache hits and/or misses.

13. The system of claim 1, wherein the plurality of computer processes associated with the communication system, track at least a number of disk access requests.

14. A method comprising:
   detecting, by a microprocessor, a plurality of computer processes that are active on one more devices in the communication system;
   gathering, by the microprocessor, a plurality of activity scores for the communication system, wherein the plurality of activity scores indicate an activity value for the plurality of computer processes associated with the communication system, wherein the plurality of computer processes track at least an average number of Back-to-Back User Agents (B2BUAs) used per communication session;
   summing, by the microprocessor, the plurality activity scores into a system activity score; and
   sending, by the microprocessor, the system activity score to a user of the communication system.

15. The method of claim 14, further comprising gathering, by the microprocessor, the plurality of activity scores from separate computer processes on two or more virtual machines.

16. The method of claim 14, further comprising gathering, by the microprocessor, the plurality of activity scores from a plurality of communication systems, wherein the system activity score is for the plurality of communication systems.

17. The method of claim 16, wherein a first computer process of the plurality computer processes is detected on a first communication system of the plurality of communication systems and wherein a second computer process of the plurality of computer processes is detected on a second communication system of the plurality of communication systems.

18. The method of claim 14, further comprising:
   gathering, by the microprocessor, a historical record of activity scores for the communication system;
   identifying, by the microprocessor, an activity score for a similar time period during a week from the historical record of activity scores for the communication system; and
   adjusting, by the microprocessor, the system activity score based on the activity score for the similar time period during the week.

19. The method of claim 14, wherein the plurality of computer processes associated with the communication system include two or more of the following computer processes that track:
   a number of current voice or video calls;
   a number of current Hyper Text Transfer Protocol (HTTP) sessions;
   a number of sent email messages over a time period;
   a number of received email messages over a time period;
   a number of current Instant Messaging (IM) sessions;
   a number of processed packets;
   a number of packet retransmissions;
   a network congestion value;
   memory usage in the communication system;
   a number of disk access requests;
   a number of fall-back servers available;
   a number of cache hits and/or misses;
   a number of logged on users;
   a total number of Back-to-Back User Agents (B2BUA) loaded;

an average number of B2BUAs used per communication session;

a number of conference calls that include three or more users;

a number of virtual machines;

a number of active virtual machines;

a number of threads;

an input from a network analyzer external to the communications system; and an input from a network analyzer.

20. An system for determining activity of a communication system comprising:

a microprocessor; and a computer readable medium, coupled with the microprocessor and comprising microprocessor readable and executable instructions that program the microprocessor to execute:

an activity monitor that detects a plurality of computer processes that are active on one more devices in the communication system, and gathers a plurality of activity scores for the communication system, wherein the plurality of activity scores indicate an activity value for the plurality of computer processes associated with the communication system, and wherein the plurality of computer processes comprises at least a number of conference calls that include three or more users; and an administration module that sends the system activity score to a user of the communication system.

* * * * *